United States Patent
Li

(10) Patent No.: US 8,098,758 B2
(45) Date of Patent: Jan. 17, 2012

(54) DIGITAL BASEBAND TRANSMITTER WITH DIGITAL RF/IF SUPPORT IN GSM/GPRS/EDGE COMPLIANT HANDSETS

(75) Inventor: Weidong Li, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 1985 days.

(21) Appl. No.: 10/933,984

(22) Filed: Sep. 3, 2004

(65) Prior Publication Data

US 2006/0050806 A1    Mar. 9, 2006

Related U.S. Application Data

(60) Provisional application No. 60/602,119, filed on Aug. 16, 2004, provisional application No. 60/603,706, filed on Aug. 23, 2004.

(51) Int. Cl.
*H04L 27/00* (2006.01)

(52) U.S. Cl. ........ 375/295; 375/377; 375/308; 375/303; 375/279; 375/272; 455/103; 455/100; 455/115.1; 455/323; 455/102; 455/113; 455/126; 455/127.4

(58) Field of Classification Search ............... 375/295, 375/377, 303, 308, 279, 272; 455/323, 333, 455/103, 100, 115.1, 102, 113, 126, 127.4
See application file for complete search history.

(56) References Cited

U.S. PATENT DOCUMENTS

| | | | | |
|---|---|---|---|---|
| 5,369,789 A * | 11/1994 | Kosugi et al. | | 455/126 |
| 5,398,002 A * | 3/1995 | Bang | | 329/302 |
| 6,381,265 B1 * | 4/2002 | Hessel et al. | | 375/219 |
| 7,035,595 B1 * | 4/2006 | Kim et al. | | 455/73 |
| 7,065,371 B1 * | 6/2006 | Kleinerman | | 455/464 |
| 7,092,676 B2 * | 8/2006 | Abdelgany et al. | | 455/76 |
| 2002/0123316 A1 * | 9/2002 | Sih et al. | | 455/245.1 |
| 2003/0026238 A1 * | 2/2003 | Baills et al. | | 370/347 |
| 2003/0109233 A1 * | 6/2003 | Shi et al. | | 455/116 |
| 2003/0109234 A1 * | 6/2003 | Shi | | 455/116 |
| 2003/0206056 A1 * | 11/2003 | Hietala | | 330/100 |
| 2004/0151140 A1 * | 8/2004 | Rozenblit et al. | | 370/335 |
| 2004/0219893 A1 * | 11/2004 | Takano et al. | | 455/114.3 |
| 2004/0229592 A1 * | 11/2004 | Matsui et al. | | 455/333 |
| 2005/0118977 A1 * | 6/2005 | Drogi et al. | | 455/323 |

* cited by examiner

*Primary Examiner* — Khanh C Tran
*Assistant Examiner* — Rahel Guarino
(74) *Attorney, Agent, or Firm* — McAndrews, Held & Malloy, Ltd.

(57) ABSTRACT

Certain aspects of a digital baseband transmitter with digital RF/IF support in GSM/GPRS/EDGE compliant devices may comprise receiving digitized data within a chip. A control signal may be generated within the chip indicating whether the received digitized data is to be processed by an IF processing interface or a digital RF processing interface. The baseband processor has the capability to work together with different kinds of RF chips on the market and since this design is implemented on a single module, most of the circuits are shared which reduces the die size significantly. This design also provides a customer more flexibility to choose among different RF vendors.

36 Claims, 5 Drawing Sheets

DIGITAL BASEBAND TRANSMITTER WITH DIGITAL RF/IF SUPPORT IN GSM/GPRS/EDGE COMPLIANT HANDSETS

CROSS-REFERENCE TO RELATED APPLICATIONS/INCORPORATION BY REFERENCE

This application makes reference to, claims priority to, and claims the benefit of U.S. Provisional Patent Application Ser. No. 60/602,119, filed on Aug. 16, 2004 and U.S. Provisional Application Ser. No. 60/603,706 filed Aug. 23, 2004.

The above stated application is incorporated herein by reference in its entirety.

FIELD OF THE INVENTION

Certain embodiments of the invention relate to digital baseband transmitters. More specifically, certain embodiments of the invention relate to a method and system for a digital baseband transmitter with digital RF/IF support in GSM/GPRS/EDGE compliant handsets.

BACKGROUND OF THE INVENTION

RF transmitters are electronic devices comprising an oscillator, modulator, and other components and circuits, which are adapted to produce a radio frequency signal. A RF transmitter comprises a plurality of stages, in which each stage is adapted to modify a signal so as to produce a desired output. In a first stage, for example, an oscillator may be adapted to generate a desired operating frequency. The output from this first stage is then amplified to a desired transmitter output value by a power amplifier.

The evolution from wireless based voice only communication networks to wireless based voice and data communication networks has resulted in the development of general packet radio service (GPRS) and enhanced data rates for the global system for mobile communications (GSM) standards. Although speech still remains the dominant service by many cellular service providers, existing systems are being upgraded to provide greater support for data communication via the radio interface.

The GSM standard, for example, provides data services with bit rates up to 14.4 kbps for circuit-switched data and up to 22.8 kbps for packet based (non-circuit switched) data. For GSM, higher bit rates may be achieved utilizing technological advancements such as high-speed circuit-switched data (HSCSD) technology and general packet radio service (GPRS) technology, which are based on the original gaussian minimum shift keying (GMSK) modulation scheme employed by GSM. In eight-state phase shift keying (8PSK), there are eight possible states that a signal can transition to at any time. 8PSK is a variation of PSK and has a symbol rate that is one third of the bit rate. Minimum Shift Keying (MSK) is used in the GSM cellular standard. Frequency Shift Keying (FSK) and MSK produce constant envelope carrier signals, which have no amplitude variations, a desirable characteristic for improving power efficiency of transmitters. In practice, waveforms are filtered with a gaussian filter, resulting in a narrow spectrum and no time domain overshoot. MSK with a gaussian filter is termed GMSK. GMSK is a spectrally efficient modulation scheme and is useful in mobile radio systems. GMSK has a constant envelope, spectral efficiency, good bit error rate (BER) performance, and is self-synchronizing.

Enhanced data for global evolution (EDGE) provides an enhancement to GPRS, which leverages a new modulation scheme along with various coding and radio link enhancements to provide much higher bit rates and capacity than GPRS. Due to the higher bit rates and the need to adapt the data protection to the channel and link quality, the EDGE radio link control (RLC) protocol is somewhat different from the corresponding GPRS protocol. EDGE is a 3G technology that delivers broadband-like data speeds to mobile devices. It allows consumers to connect to the Internet and to send and receive data, including digital images, web pages and photographs, three times faster than possible with an ordinary GSM and or GPRS networks. EDGE enables GSM operators to offer higher-speed mobile-data access, serve more mobile-data customers, and free up GSM network capacity to accommodate additional voice traffic.

As the operating requirements for wireless devices become more demanding, the complexity of the interactions between data processing hardware and RF transmitters also increases. For example, RF transmitters from various vendors may be required to work effectively with a baseband processor from a different vendor. The use of individual baseband transmitter interfaces for each of the possible RF transmitters with which a baseband processor may interface, may prove to be costly in terms of layout space in an integrated circuit. Because component size and cost are critical concerns in wireless devices, the use of multiple baseband transmitter interfaces should be limited as much as possible. Moreover, this approach may also limit the number of possible interfaces that may be implemented with a particular baseband processor.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention provide a method and system for a digital baseband transmitter with digital RF/IF support in GSM/GPRS/EDGE compliant devices such as handsets, for example. Aspects of the method may comprise receiving digitized data within a chip, for example, from a DSP. A control signal may be generated within the chip, which indicates whether the received digitized data is to be processed by an IF processing interface or a digital RF processing interface. The received digitized data may be modulated either using GMSK modulation if the received digitized data is a GSM or GPRS signal, or using 8PSK modulation if the received digitized data is an EDGE signal. At least one frequency component of the received digitized data may be offset to compensate for a difference in frequency between a base station and a device, for example, a handset. The received digitized data may be further converted to analog data, which may be filtered to lower the input data rate and reduce the inherent D/A roll-off.

A first signal may be generated that controls start of transmission of the digitized data to the digital RF processing interface. The received digitized data may be modulated and a second signal may be generated that starts serial transfer of the modulated received digitized data. A third signal may be generated that synchronizes the serial transfer of the modulated received digitized data. A fourth signal may be generated that transfers output serial modulated received digitized data. The received digitized data may be buffered.

Another embodiment of the invention may provide a machine-readable storage, having stored thereon, a computer program having at least one code section executable by a machine, thereby causing the machine to perform the steps as described above for a digital baseband transmitter with digital RF/IF support in GSM/GPRS/EDGE compliant handsets.

In accordance with another embodiment of the invention, a system for supporting GSM, GPRS and EDGE utilizing a baseband transmitter may be provided. In this regard, the system may comprise circuitry that receives digitized data within a chip. The circuitry may be adapted to generate a control signal within the chip indicating whether the received digitized data is to be processed by an IF processing interface or a digital RF processing interface. A transmit burst buffer may receive the digitized data from a DSP.

The system may comprise a modulator that modulates the received digitized data either using GMSK modulation if the received digitized data is a GSM signal or a GPRS signal, or using 8PSK modulation if the received digitized data is an EDGE signal. At least one frequency component of the received digitized data may be offset using an offset register to compensate for a difference in frequency between a base station and the device. The received digitized data may be further converted to analog data by a digital to analog converter (DAC), and may be filtered using an interpolation filter to lower the input data rate and reduce the inherent D/A roll-off.

The system may comprise a state machine that generates a first signal that controls start of transmission of the digitized data to the digital RF processing interface. A modulator may modulate the received digitized data and a second signal may be generated by the state machine that starts serial transfer of the modulated received digitized data. A counter may be adapted to generate a third signal that synchronizes the serial transfer of the modulated received digitized data. A shift register may be adapted to control generating a fourth signal that transfers output serial modulated received digitized data. A transmit burst buffer may be adapted to buffer the received digitized data.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a digital baseband transmitter with digital RF/IF support in GSM/GPRS/EDGE compliant handsets. The digital RF transmitter is a new standard baseband RF interface for GSM/GPRS/EDGE enabled devices providing more flexibility to customers to choose among different RF vendors. This design may be utilized to integrate RF into a baseband chip to generate a true single chip GSM/GPRS/EDGE product.

Figure 1A:
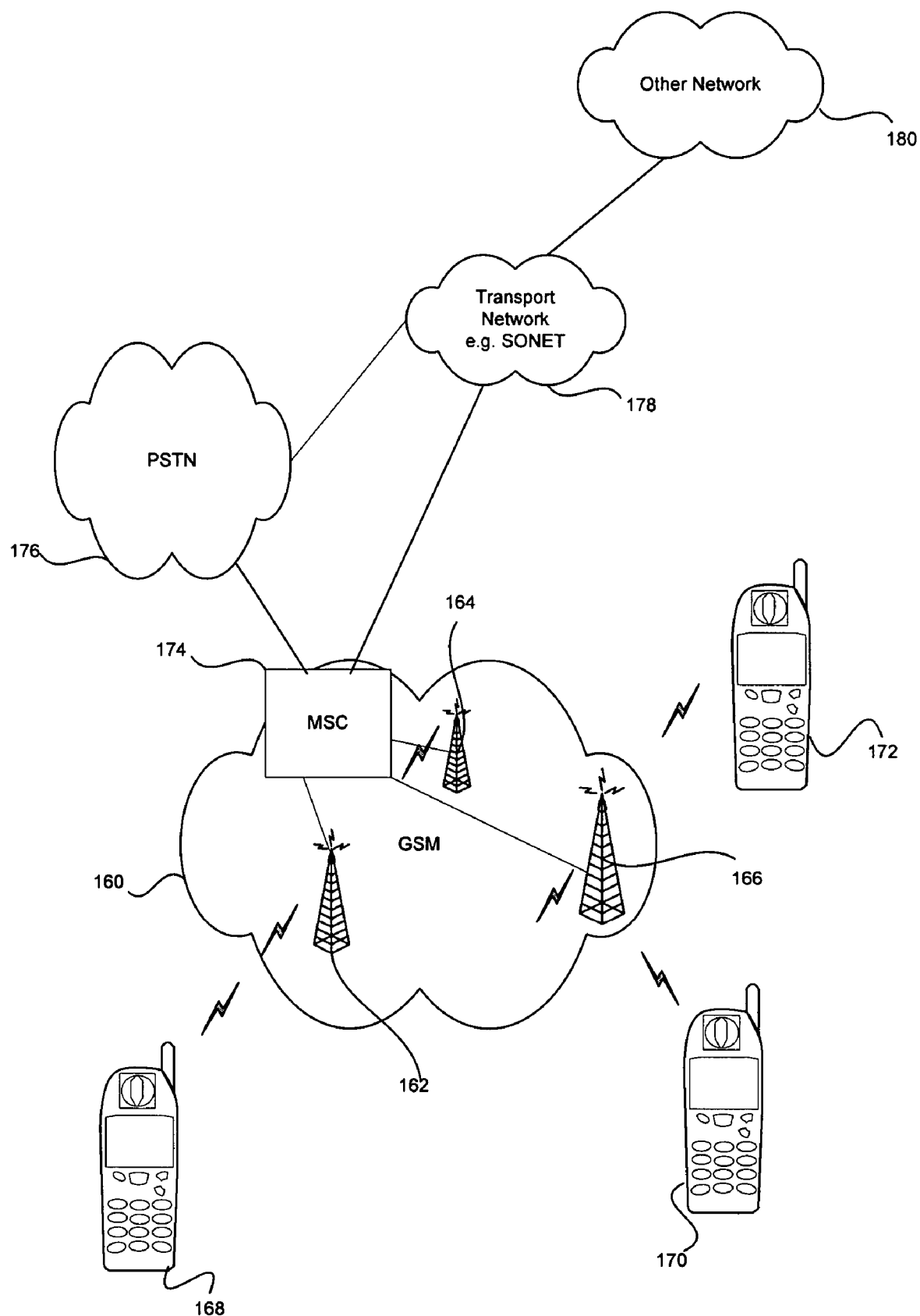
FIG. 1a is a block diagram of an exemplary system that may be utilized in connection with an embodiment of the invention.

FIG. 1a is a block diagram of an exemplary system that may be utilized in connection with an embodiment of the invention. Referring to FIG. 1, there is shown a GSM network 160, a mobile switching center 174, a public switched telephone network (PSTN) 176, a transport network 178 and an other network block 180. The GSM network 160 may comprise a plurality of cell sites 162, 164 and 166 (also known as cellular towers) that are located in geographical cells within the network. Cell sites 162, 164 and 166 may provide cellular service to mobile access devices, for example, handsets, 168, 170 and 172. The mobile access devices 168, 170 and 172 lie within the range of the cell sites 162, 164 and 166 respectively. The wireless service provider network 160 may utilize GSM's TDMA access technology and may include EDGE and/or GPRS data capability.

The mobile switching center MSC 174 may be adapted to confirm a caller group to which a corresponding caller belongs by checking a number when a call is initiated from the caller, receiving a called number, authenticating and authorizing the caller, and processing the caller and the call according to the caller group to which the caller belongs. When the authentication and authorization succeed, the process searches for a predefined greeting announcement for the particular caller group and, if one is found, connects the predefined greeting announcement to the caller. The process also determines according to the caller group whether a certain trunk should be used and, if so, connects the call to that trunk.

A public switched telephone network (PSTN) 174 may be coupled to the MSC 174 and may be a domestic telecommunications network that may be accessed by mobile wireless systems to connect with and to complete calls to plain old telephone service (POTS) subscribers, for example.

The transport network 178 may be a high bandwidth communication network, such as a SONET or OC-48 which may be adapted to transport voice, video and data to and from the PSTN 176 and/or MSC 174. The transport network 178 may comprise network elements like multiplexers, cross-connects and high speed transport equipment. Other networks block 180 may comprise other networks, for example, a wired or wireless network, such as a CDMA network.

Within the GSM network 160, each of the cell sites within a cell may be coupled to a base transceiver station (BTS) and one or more base transceiver stations (BTSs) may be coupled to a base station controller (BSC). One or more base station controllers (BSCs) may be coupled to a network edge switch called a mobile switching center (MSC) 174. The MSC 174 may be coupled to, for example, the PSTN 176 and other networks 180 via the transport network 178 and may be adapted to incorporate one or more network filters to identify multimedia information being transferred during a communication session.

In operation, when a mobile access device 168 that lies within the range of cell site 162 wants to access another mobile access device 170 that lies within the range of cell site 166, the cell site 162 sends a signal to the MSC 174 which switches the signal to cell site 166 and provides cellular service to mobile access device 166.

Figure 1B:
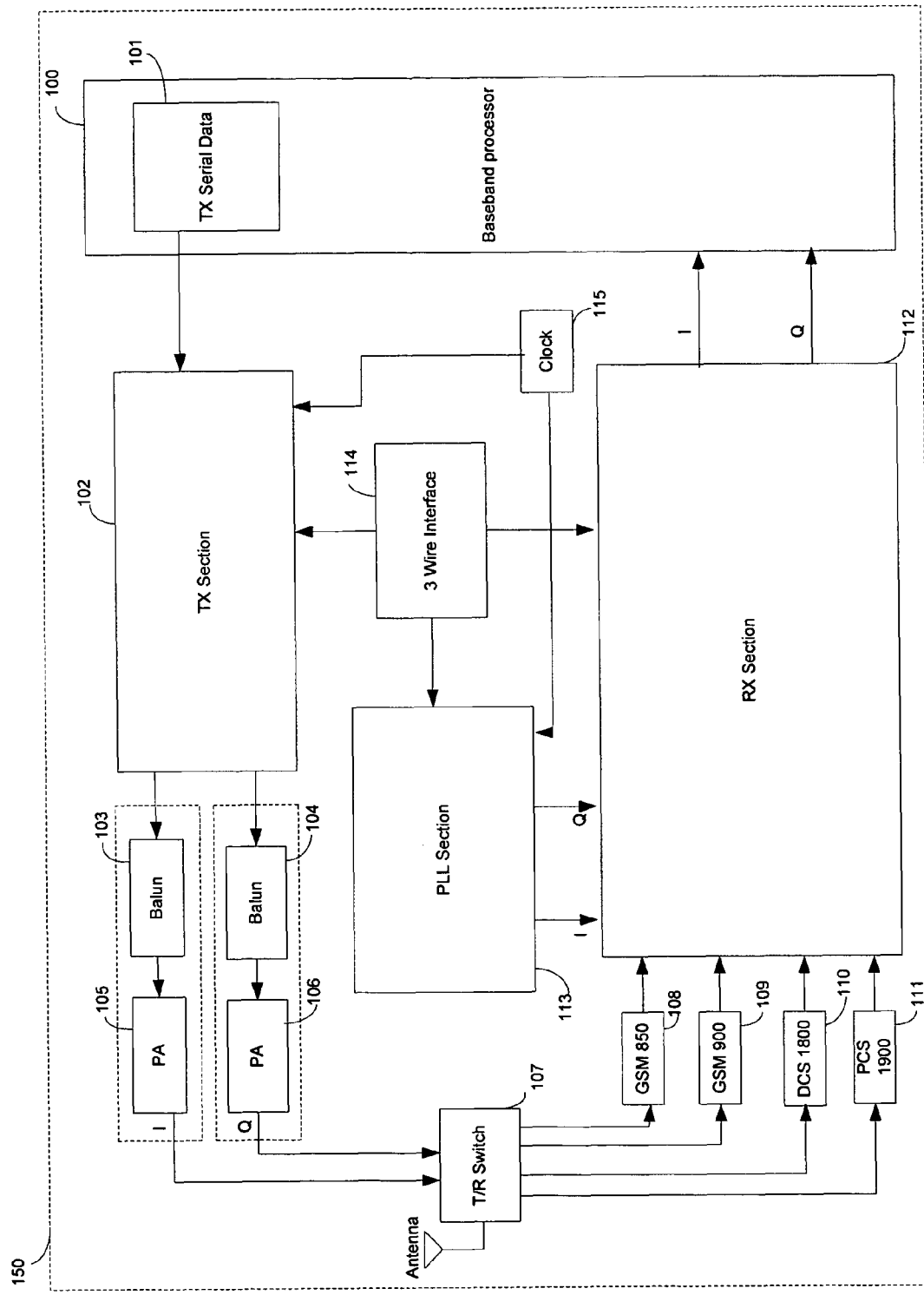
FIG. 1b is a block diagram of an exemplary transceiver (Tx/Rx) system that may be utilized in connection with an embodiment of the invention.

FIG. 1b is a block diagram of an exemplary transceiver (Tx/Rx) system, which may be implemented as a single integrated circuit or chip (e.g., 150), that may be utilized in connection with an embodiment of the invention. Referring to FIG. 1b, the chip 150 comprises a baseband processor 100, a transmitter section (TX Section) 102, balanced to unbalanced (Balun) transformers 103 and 104, power amplifiers (PA) 105 and 106, a transmitter/receiver switch (T/R switch) 107, bandpass filters 108, 109, 110, 111, a receiver section (RX section) 112, a PLL section 113, a 3-wire interface 114 and a clock 115. The baseband processor 100 comprises a TX serial data block 101.

The baseband processor 100 may be, for example, an ARM processor or other suitable type of processor, which may be adapted to produce output signals which are corresponding I and Q components. The baseband processor 100 provides a digital platform for baseband processing functions which may comprise analog and digital GSM/GPRS/EDGE baseband processing functions on a single CMOS chip. The baseband processor 100 comprises the TX serial data 101, which transmits data serially to the TX section 102.

The TX section 102 may be adapted to modulate an information signal to a suitable carrier frequency in a range of about 1648-1910 MHz, for example, and a resulting modulated signal may be split into two allocated parts of the electromagnetic spectrum in the range of about 1710-1910 MHz and about 824-915 MHz, for example.

The baluns 103 and 104 are balanced to unbalanced networks, and may comprise suitable circuitry which may be adapted to minimize unwanted radiation. The power amplifiers 105 and 106 may be adapted to provide a high output current to drive an antenna which may be a low-impedance load. The T/R switch 107 may be adapted to provide switching for the antenna circuit between transmit and receive sections 102 and 112 respectively.

The bandpass filters 108, 109, 110, 111 may be adapted to allow signals within a particular frequency range to pass through. The bandpass filter 108 may be adapted to output frequencies within GSM 850 band, which may provide GSM downlink signals in the range of about 869-894 MHz, for example. The bandpass filter 109 may be adapted to output frequencies within GSM 900 band, which may provide GSM downlink signals in the range of about 925-960 MHz, for example. The bandpass filter 110 may be adapted to output frequencies within digital cellular system (DCS) 1800 band, which may provide a GSM downlink in the range of about 1805-1880 MHz. The bandpass filter 111 may be adapted to output frequencies within the personal communications service (PCS) 1900 band, which may provide a GSM downlink in the range of about 1930-1990 MHz.

The receiver section 112 may be adapted to down-convert the GSM downlink signals into intermediate frequency (IF) signals of bandwidth about 100 kHz, for example. The PLL section 113 may be a closed loop frequency control system that comprises an electronic circuit which may control an oscillator so that the modulated signal maintains a constant phase angle (i.e., lock) on the frequency of an input, or reference signal. The PLL section 113 ensures that a communication signal is locked on a specific frequency and may further be used to generate, modulate, demodulate a signal and divide a frequency of an input signal.

The 3-wire interface 114 may be utilized to couple the TX section 102, RX section 112 and the PLL section 113. Although a 3-wire interface is utilized, the system may not be limited in this regard. Accordingly, other serial interfaces may be used. The Clock 115 may be a crystal, for example a quartz crystal running at a frequency of about 26 MHz which may be adapted to drive the TX section 102 and the PLL section 113.

In operation, the baseband processor 100 may be adapted to provide a digital platform for baseband processing functions which may comprise analog and digital GSM/GPRS/EDGE baseband processing functions. The baseband processor 100 comprises the TX serial data 101, which transmits data serially to the TX section 102. At TX section 102, the received data from the TX serial data 101 is modulated to a suitable carrier frequency in a range of about 1648-1910 MHz, for example, and a resulting modulated signal is split into two allocated parts of the electromagnetic spectrum in a range of about 1710-1910 MHz, for example, and about 824-915 MHz, for example.

The modulated signals from the TX section 102 are then passed through two baluns 103 and 104. When an unbalanced transmission line is connected to a balanced antenna, extraneous currents run along the outer surface of the transmission line. Although impedances may be equal, the extraneous currents may cause unwanted radiation which may be minimized by using a balanced-to-unbalanced network placed between an antenna and an antenna feeder, which may be the TX section 102, for example. The outputs from baluns 103 and 104 are passed through power amplifiers 105 and 106, which are designed to provide a high output current to drive an antenna which may be a low-impedance load.

The T/R switch 107 may be adapted to provide switching for the antenna circuit between transmit and receive sections 102 and 112 respectively. When the T/R switch 107 is configured for receiving, the modulated signals may be passed through band pass filters 108, 109, 110 and 111. The output of bandpass filter 108 is the GSM 850 band which may provide GSM downlink signals in the range of about 869-894 MHz, for example. The output of bandpass filter 109 is the GSM 900 band which may provide GSM downlink signals in the range of about 925-960 MHz, for example. The output of bandpass filter 110 is the digital cellular system (DCS) 1800 band which may provide GSM downlink signals in the range of about 1805-1880 MHz, for example and is used in most countries where GSM networks are found, except for the United States. The output of bandpass filter 111 is the personal communications service (PCS) 1900 band which may provide GSM downlink signals in the range of about 1930-1990 MHz, for example which is generally used in the United States.

The RX section 112 receives the GSM downlink signals and down-converts each signal into intermediate frequency (IF) signals of bandwidth about 100 kHz, for example, by a mixer. In the mixer stage of the receiver section 112, the required signal frequency may be mixed with the I and Q components, which are generated by the PLL section 113 to produce a difference frequency, which may be the intermediate frequency (IF). The analog output IF signals may then be converted into digital signals by an analog to digital converter (ADC) in the baseband processor 100.

Figure 2:
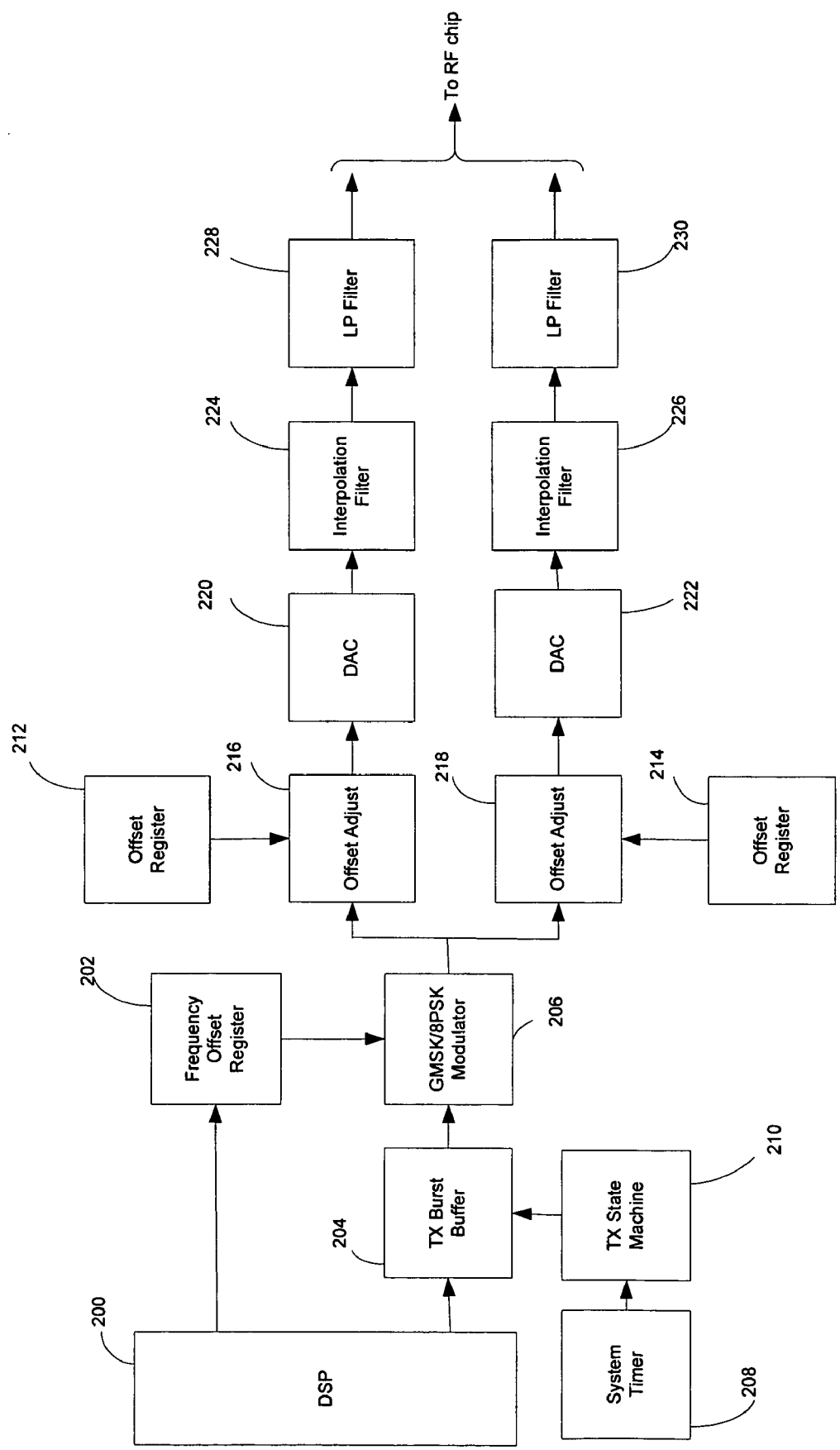
FIG. 2 is a block diagram illustrating an exemplary IF interface of the transceiver (Tx/Rx) system of FIG. 1 which may be utilized in connection with an embodiment of the invention.

FIG. 2 is a block diagram illustrating an exemplary IF interface of the transceiver (Tx/Rx) system of FIG. 1, for example, which may be utilized in connection with an embodiment of the invention. Referring to FIG. 2, the system comprises a DSP 200, a system timer 208, a TX state machine 210, a frequency offset register 202, a TX burst buffer 204, a GMSK/8PSK modulator 206, offset registers 212 and 214, offset adjust blocks 216 and 218, 9-bit digital to analog converters (DAC) 220 and 222, interpolation filters 224 and 226 and low pass filters 228 and 230.

The DSP 200 may be a high speed arithmetic processor utilized to transfer data to and from the RF chip. The system timer 208 may be a reference clock running at a frequency of about 26 MHz, for example and may be utilized as a global timer for a device, for example, a handset. The TX state machine 210 may be a high level control system with a stack of registers that may provide feedback at various sections to decide when data is transmitted to the TX burst buffer 204. The frequency offset register 202 is a program enabled register that may be adapted to control the offset in frequency between a base station and a device, for example, a handset, by programming bits in the frequency offset register 202.

The TX burst buffer 204 may comprise suitable circuitry and logic that may be adapted to function as a temporary data storage buffer, for example, when a device which has a DSP 200 wants to transmit data, the data may be buffered by the TX burst buffer 204. The GMSK/8PSK modulator 206 modulates the received data from the TX burst buffer 204 using either GMSK modulation if the received data is a GSM, or a GPRS signal. If the received data is an EDGE signal, the GMSK/8PSK modulator 206 may utilize 8PSK modulation.

The offset registers 212 and 214 may be adapted to be programmed by the DSP 200 to control offset adjust blocks 216 and 218. Offset adjust blocks 216 and 218 may be adapted to compensate for a difference in frequency between a base station and a device, for example, a handset.

The DAC blocks 220 and 222 may be adapted to convert digitized signals to analog signals. In an embodiment of the invention the DAC blocks 220 and 222 may be 9-bit DAC's. Interpolation filters 224 and 226 may be adapted to lower input data rate and reduce inherent D/A roll-off. The low pass filters 228 and 230 may comprise suitable logic, circuitry and/or code that may be adapted to inhibit aliasing and eliminate unwanted high frequency noise from the analog signals.

In operation, when a device such as a DSP 200 wants to transmit data, the TX burst buffer 204 acts as a temporary data storage buffer. The DSP 200 may be adapted to send data by pulse transmission, where the data is sent out in short bursts, unlike analog transmission where the data is sent out continuously. The system timer 208 may be utilized as a global timer and is coupled to the TX state machine 210. The TX state machine 210 is a high level control system with a stack of registers that may provide feedback at various sections to decide when data is transmitted to the TX burst buffer 204. The frequency offset register 202 is a program enabled register that may be adapted to control the offset in frequency between a base station and a device, for example, a handset, by programming bits in the frequency offset register 202.

The frequency offset register 202 may control some of the operation of the GMSK/8PSK modulator 206. The GMSK/8PSK modulator 206 modulates the received data from the TX burst buffer 204 using either GMSK modulation if the received data is a GSM, or a GPRS signal, or 8PSK modulation if the received data is an EDGE signal. The in-phase (I) and quadrature (Q) components of the modulated signal are passed to the offset adjust blocks 216 and 218 for processing. The offset adjust blocks 216 and 218 may be adapted to compensate for a difference in frequency between a base station and a device, for example, a handset. Offset adjust blocks 216 and 218 may be controlled by offset registers 212 and 214, which may be further adapted to be programmed by the DSP 200.

The I and Q components of the modulated signal may further be passed to the DAC blocks 220 and 222 respectively, wherein the digitized signals are converted to analog signals. These signals are further filtered by passing them to interpolation filters 224 and 226 respectively, to lower the input data rate and reduce the inherent D/A roll-off. The interpolation filters 224 and 226 are coupled to the low pass filters 228 and 230 respectively, wherein the I and Q components of the modulated signal are filtered to inhibit aliasing and eliminate or mitigate the effects of noise such as unwanted high frequency noise.

Figure 3:
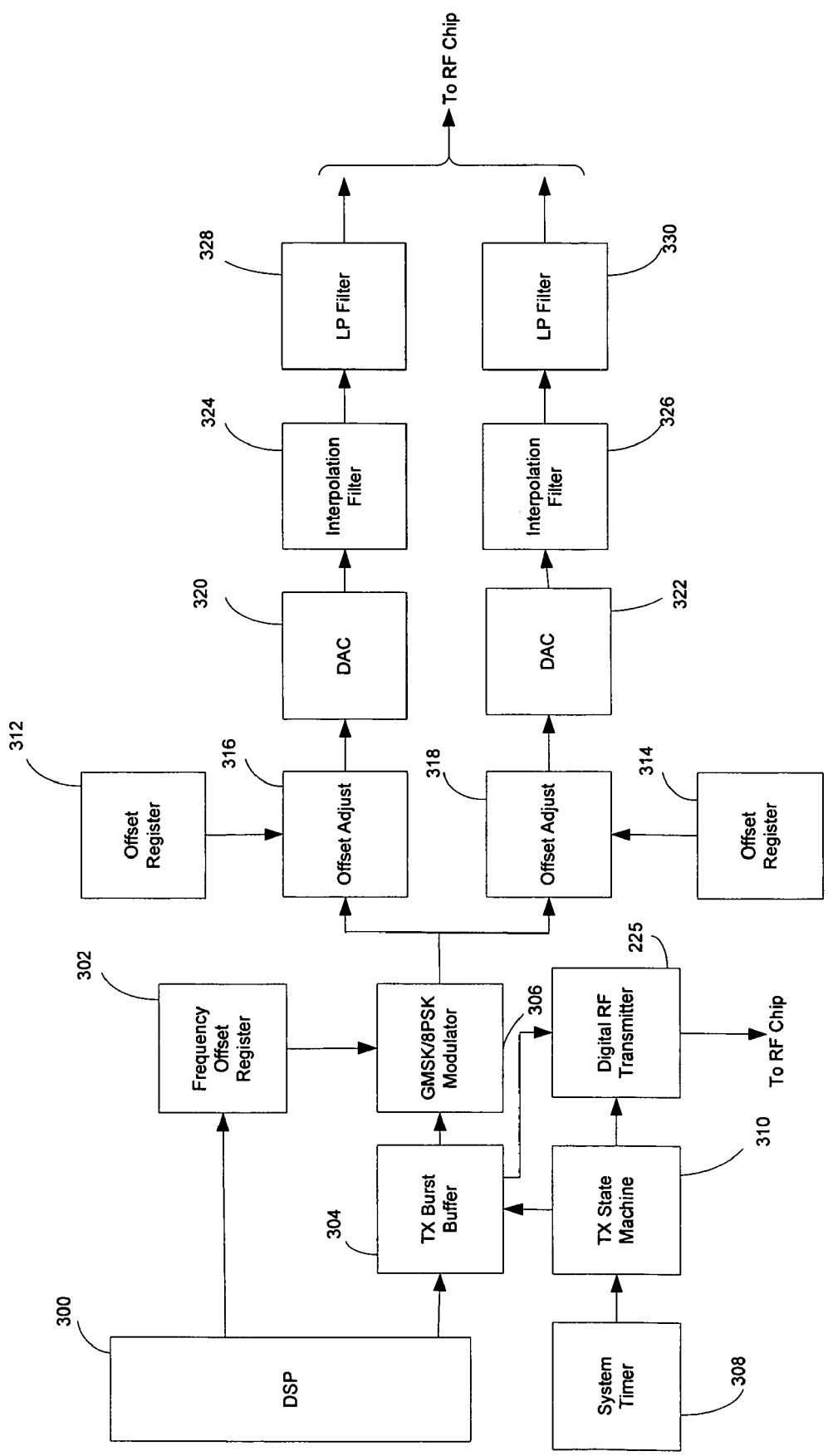
FIG. 3 is a block diagram illustrating a digital RF transmitter implementation which may support both an analog IF and digital RF interface in accordance with an embodiment of the invention.

FIG. 3 is a block diagram illustrating a digital RF transmitter implementation which may support both analog IF and digital RF interface, in accordance with an embodiment of the invention. Referring to FIG. 3, the system comprises a DSP 300, a system timer 308, a TX state machine 310, a digital RF transmitter 225, a frequency offset register 302, a TX burst buffer 304, a GMSK/8PSK modulator 306, offset registers 312 and 314, offset adjust blocks 316 and 318, digital to analog converters (DAC) 320 and 322, interpolation filters 324 and 326 and low pass filters 328 and 330. Except for the digital RF transmitter 225, the components of FIG. 3 are similar to the components of FIG. 2.

The digital RF transmitter 225 increases the capability of the chip so that the chip may provide an interface for handling both analog IF and digital RF. The baseband processor has the capability to work together with different kinds of RF chips on the market and since this design is implemented on a single module, most of the circuits are shared which reduces the die size significantly. This design also provides a customer more flexibility to choose among different RF vendors.

Although FIG. 3 is somewhat similar to FIG. 2, FIG. 3 further comprises the digital RF transmitter 225 which is coupled to the TX state machine 310 and the TX burst buffer 304. The TX burst buffer 304 may be adapted to function as a temporary data storage buffer when the DSP 300 wants to transmit data to the digital RF transmitter 225. When the DSP 300 wants to transmit data, the TX state machine 310 may be adapted to send a signal to the digital RF transmitter 225 which may further send it to the RF chip. The digital RF transmitter 225 may comprise circuitry that may be adapted to receive a plurality of input signals from the state machine 310 and the DSP 300, and accordingly generate a plurality of output signals to start transmission of modulated data to the RF chip.

Figure 4:
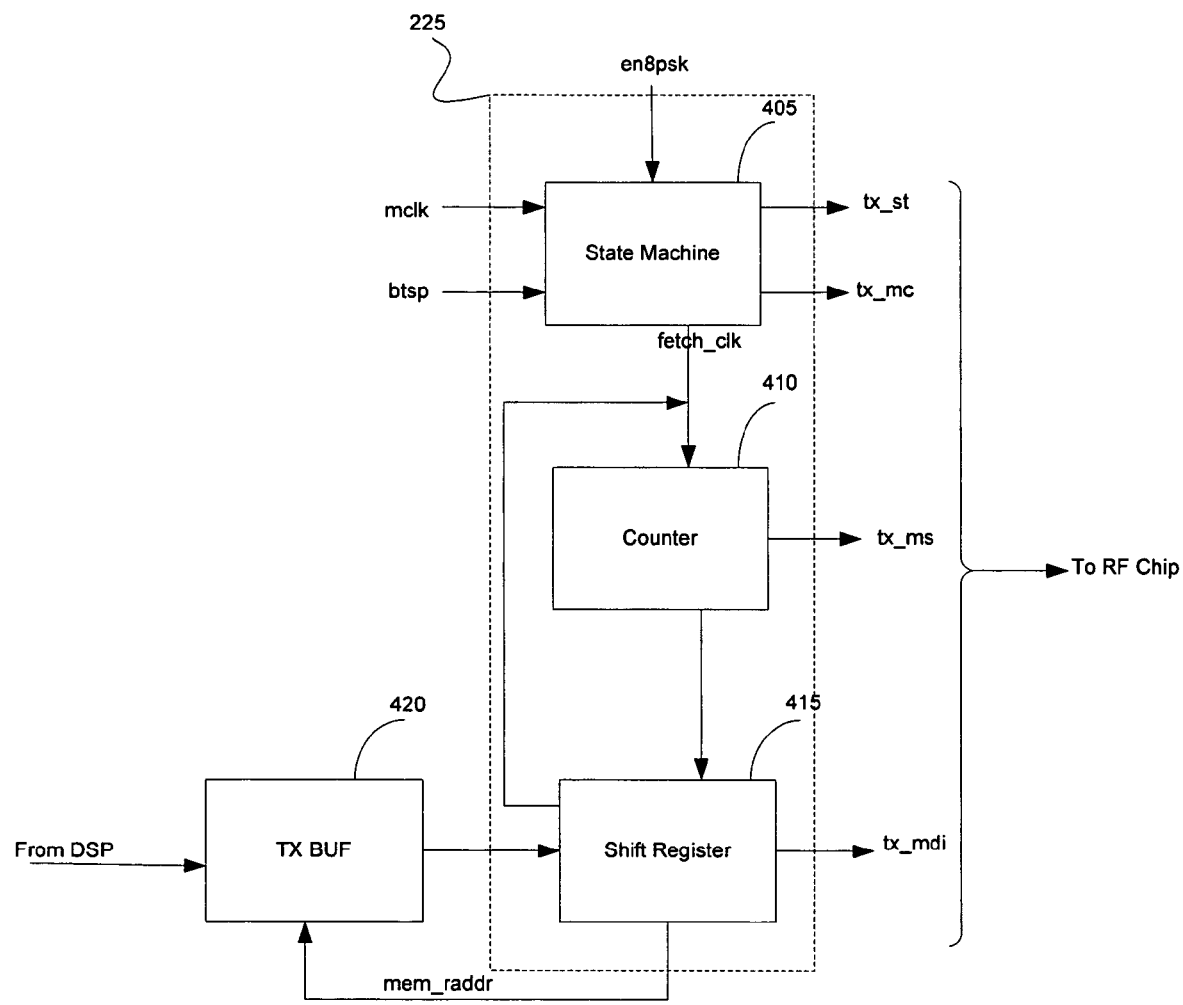
FIG. 4 is a block diagram illustrating one embodiment of the digital RF transmitter block of FIG. 3, for example, in accordance with an embodiment of the invention.

FIG. 4 is a block diagram illustrating the digital RF transmitter block of FIG. 3, for example, in accordance with an embodiment of the invention. Referring to FIG. 4, the digital RF transmitter 225 comprises a state machine 405, a counter 410, a shift register 415 and a transmission data buffer (TX buffer) 420.

The state machine 405 may be adapted to receive a plurality of input signals such as a master clock (mclk), a bit synchronization pulse (btsp) and an enable signal (en8psk), and accordingly generate a plurality of output signals such as a transmit start signal (tx_st) and a modulation clock signal (tx_mc). The counter 410 may receive an input fetch clock (fetch_clk) from the state machine 405 and may output a synchronization pulse (tx_ms). The shift register 415 may receive inputs from the counter 410 and the transmit burst buffer (TX BUF) 420 and may output a modulation data output signal (tx_mdi). The TX BUF 420 transmits data to the shift register 415 and may receive data input from the DSP and a memory address signal (mem_raddr) from the shift register 415.

The master clock (mclk) signal may have a frequency of about 13 MHz, for example, and may be used to drive the digital RF transmitter 225. The bit synchronization pulse (btsp) is the output of the high level TX state machine 310 and the state machine 405 may send data to the counter 410, shift register 415 and the TX buffer 420 in response to receiving the btsp signal from the state machine 310. The selection signal, enable 8psk (en8psk) may be utilized to select between GMSK or 8PSK modulation. GMSK modulation is used in GSM and or GPRS compliant devices. On the other hand, 8PSK modulation is used in EDGE compliant devices.

The transmit start signal tx_st may be generated by the state machine 405 to start the transmission of data from the digital RF transmitter 225 to the RF chip. The modulation data serial transfer clock signal tx_mc may be generated by the state machine 405 to start the serial transfer of modulated data to the RF chip. The fetch clock fetch_clk signal may be generated by the state machine 405 and may comprise logic and or code to drive the counter 410. The modulation data serial transfer synchronization pulse tx_ms is a synchronization pulse signal that may be generated by the counter 410 for the serial transfer of modulated data to the RF chip. The shift register 415 may comprise a group of flip-flops operating as a coherent unit to hold and shift data from one flip-flop to another. The modulation data serial transfer data signal tx_mdi may be generated by the shift register 415 to output modulation data to the RF chip. The memory address signal mem_raddr may be generated by the shift register 415, which provides the memory address to let the TX BUF 420 know which byte has to be shifted out. The TX BUF 420 is similar to TX burst buffer 204 and may comprise suitable circuitry and logic that may be adapted to function as a temporary data storage buffer, for example, when a device which has a DSP 300 wants to transmit data, the data may be buffered by the TX BUF 420.

The state machine 405 may be a low level controller that controls activity within the digital RF transmitter 225. The master clock (mclk) signal may have a frequency of about 13 MHz, for example, and may be used to drive the digital RF transmitter 225. The state machine 405 may be triggered by a bit synchronization pulse (btsp), which is the output of the high level TX state machine 310. The state machine 405 may send data to the counter 410, shift register 415 and the TX buffer 420 in response to receiving the btsp signal from state machine 310. A selection signal, enable 8psk (en8psk) may be utilized to select between GMSK or 8PSK modulation.

The transmission of data may be started by the state machine 405 by generating the transmit start signal tx_st to the RF chip. The serial transfer of modulated data to the RF chip may be started by the serial transfer clock signal tx_mc. The fetch_clk signal may be generated by the state machine 405 to drive the counter 410. The serial transfer of modulated data to the RF chip may be synchronized by the synchronization pulse tx_ms that may be generated by the counter 410. The modulation data may be transmitted to the RF chip by the transfer data signal tx_mdi, which may be generated by the shift register 415. The memory address signal mem_raddr may be generated by the shift register 415, which provides the memory address to let the TX BUF 420 know which byte has to be shifted out.

In accordance with an embodiment of the invention, the system may comprise circuitry that receives digitized data within a chip. The circuitry may be adapted to generate at least one control signal within the chip, which indicates whether the received digitized data is to be processed by an IF processing interface or a digital RF processing interface. A transmit burst buffer 304 may receive the digitized data from the DSP.

The system may comprise a modulator 306 that modulates the received digitized data either using GMSK modulation if the received digitized data is a GSM or a GPRS signal, or using 8PSK modulation if the received digitized data is an EDGE signal. The frequency components of the received digitized data may be offset using offset registers 312 and 314 to compensate for difference in frequency between a base station and a device, for example, a handset. The digital to analog converters (DAC) 320 and 322 convert the received digitized data to analog data. The analog data may be filtered utilizing interpolation filters 324 and 326 to lower the input data rate and reduce the inherent D/A roll-off and low pass filters 328 and 330 to inhibit aliasing and eliminate or mitigate the effects of noise such as unwanted high frequency noise.

A state machine 405 may be adapted to generate a first signal (tx_st) that controls start of transmission of the digitized data to the digital RF processing interface. The modulator 306 may modulate the received digitized data and a second signal (th_mc) may be generated by the state machine 405 that starts serial transfer of the modulated received digitized data. A counter 410 may be adapted to generate a third signal (tx_ms) that synchronizes the serial transfer of the modulated received digitized data. A shift register 415 may be adapted to generate a fourth signal (tx_mdi) that transfers output serial modulated received digitized data and a fifth signal (mem_raddr), which provides the memory address to let the TX BUF 420 know which byte has to be shifted out A transmit burst buffer 420 may buffer the received digitized data. The baseband processor has the capability to work together with different kinds of RF chips on the market and since this design is implemented on a single module, most of the circuits are shared, which reduces the die size significantly. This design also provides a customer more flexibility to choose among different RF vendors.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for supporting GSM, GPRS and EDGE utilizing a baseband transmitter, the method comprising:

Performing by one or more circuits integrated within a chip:

Receiving digitized data within said chip; wherein said digitized data is one or more of GSM, GPRS and EDGE data; and generating at least one control signal from within said chip, which indicates whether said received digitized data, is to be processed by an analog IF processing interface or a digital baseband RF processing interface.

2. The method according to claim 1, comprising receiving said digitized data from a DSP.

3. The method according to claim 1, comprising modulating said received digitized data using GMSK modulation, if said received digitized data is a GSM or GPRS signal.

4. The method according to claim 1, comprising modulating said received digitized data using 8PSK modulation, if said received digitized data is an EDGE signal.

5. The method according to claim 1, comprising offsetting at least one frequency component of said received digitized data.

6. The method according to claim 1, comprising converting said digitized data to analog data.

7. The method according to claim 6, comprising filtering said analog data.

8. The method according to claim 1, comprising generating at least a first signal that controls start of transmission of said digitized data to said digital RF processing interface.

9. The method according to claim 1, comprising:
modulating said received digitized data; and
generating at least a second signal that starts serial transfer of said modulated received digitized data.

10. The method according to claim 9, comprising generating at least a third signal that synchronizes said serial transfer of said modulated received digitized data.

11. The method according to claim 9, comprising generating at least a fourth signal that transfers output serial modulated received digitized data.

12. The method according to claim 1, comprising buffering said received digitized data.

13. A non-transitory computer-readable medium having stored thereon, a computer program having at least one code section for supporting GSM, GPRS and EDGE utilizing a baseband transmitter, the at least one code section being executable by a computer for causing the computer to perform steps comprising:
receiving digitized data within a chip; wherein said digitized data is one or more of GSM, GPRS and EDGE data; and generating at least one control signal from within said chip, which indicates whether said received digitized data is to be processed by an analog IF processing interface or a digital baseband RF processing interface.

14. The non-transitory computer-readable medium according to claim 13, wherein said at least one code section comprises code for receiving said digitized data from a DSP.

15. The non-transitory computer-readable medium according to claim 13, wherein said at least one code section comprises code for modulating said received digitized data using GMSK modulation, if said received digitized data is a GSM or GPRS signal.

16. The non-transitory computer-readable medium according to claim 13, wherein said at least one code section comprises code for modulating said received digitized data using 8PSK modulation, if said received digitized data is an EDGE signal.

17. The non-transitory computer-readable medium according to claim 13, wherein said at least one code section comprises code for offsetting at least one frequency component of said received digitized data.

18. The non-transitory computer-readable medium according to claim 13, wherein said at least one code section comprises code for converting said digitized data to analog data.

19. The non-transitory computer-readable medium according to claim 18, wherein said at least one code section comprises code for filtering said analog data.

20. The non-transitory computer-readable medium according to claim 13, wherein said at least one code section comprises code for generating at least a first signal that controls start of transmission of said digitized data to said digital RF processing interface.

21. The non-transitory computer-readable medium according to claim 13, wherein said at least one code section comprises code for:
modulating said received digitized data; and
generating at least a second signal that starts serial transfer of said modulated received digitized data.

22. The non-transitory computer-readable medium according to claim 21, wherein said at least one code section comprises code for generating at least a third signal that synchronizes said serial transfer of said modulated received digitized data.

23. The non-transitory computer-readable medium according to claim 21, wherein said at least one code section comprises code for generating at least a fourth signal that transfers output serial modulated received digitized data.

24. The non-transitory computer-readable medium according to claim 13, wherein said at least one code section comprises code for buffering said received digitized data.

25. A system for supporting GSM, GPRS and EDGE utilizing a baseband transmitter, the system comprising:
circuitry for receiving digitized data within a chip; wherein said digitized data is one or more of GSM, GPRS and EDGE data; and circuitry for generating at least one control signal from within said chip, which indicates whether said received digitized data is to be processed by an analog IF processing interface or a digital baseband RF processing interface.

26. The system according to claim 25, comprising a transmit burst buffer that receives said digitized data from a DSP.

27. The system according to claim 25, comprising a modulator that modulates said received digitized data using GMSK modulation, if said received digitized data is a GSM or GPRS signal.

28. The system according to claim 25, comprising a modulator that modulates said received digitized data using 8PSK modulation, if said received digitized data is an EDGE signal.

29. The system according to claim 25, comprising an offset register that controls offset of at least one frequency component of said received digitized data.

30. The system according to claim 25, comprising a digital to analog converter that converts said digitized data to analog data.

31. The system according to claim 30, comprising a filter that filters said analog data.

32. The system according to claim 25, comprising a state machine that generates at least a first signal that controls start of transmission of said digitized data to said digital RF processing interface.

33. The system according to claim 25, comprising:
a modulator that modulates said received digitized data; and
a state machine that generates at least a second signal that starts serial transfer of said modulated received digitized data.

34. The system according to claim 33, comprising a counter that generates at least a third signal that synchronizes said serial transfer of said modulated received digitized data.

35. The system according to claim 33, comprising a shift register that generates at least a fourth signal that transfers output serial modulated received digitized data.

36. The system according to claim 25, comprising a transmit burst buffer that buffers said received digitized data.

* * * * *